(12) United States Patent
Wang et al.

(10) Patent No.: US 8,036,263 B2
(45) Date of Patent: Oct. 11, 2011

(54) SELECTING KEY FRAMES FROM VIDEO FRAMES

(75) Inventors: Haohong Wang, San Diego, CA (US);
Narendranath Malayath, San Diego, CA (US); Suhail Jalil, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1673 days.

(21) Appl. No.: 11/317,934

(22) Filed: Dec. 23, 2005

(65) Prior Publication Data

US 2007/0147504 A1    Jun. 28, 2007

(51) Int. Cl.
*H04N 7/12* (2006.01)
(52) U.S. Cl. .................. 375/240.01; 348/218.1
(58) Field of Classification Search ............... 375/240.1; 348/208.6, 208.12, 700, 701; 396/52
See application file for complete search history.

(56) References Cited

U.S. PATENT DOCUMENTS

| | | | |
|---|---|---|---|
| 7,075,569 B2 * | 7/2006 | Niikawa | 348/218.1 |
| 2002/0146168 A1 | 10/2002 | Lee et al. | |
| 2005/0228849 A1 * | 10/2005 | Zhang | 709/200 |

FOREIGN PATENT DOCUMENTS

| | | | |
|---|---|---|---|
| JP | 2003032583 A | 1/2003 |
| JP | 2003061112 A | 2/2003 |
| JP | 2005525034 A | 8/2005 |
| WO | WO03096229 A2 | 11/2003 |

OTHER PUBLICATIONS

Brunelli R. et al: "A Survey on the Automatic Indexing of Video Data," Journal of Visual Communication and Image Representation, vol. 10, No. 2, Jun. 1999.
Burnett I et al: "Universal multimedia experiences f o r tomorrow" IEEE Signal Processing Magazine, IEEE Service Center, Piscataway, NJ, US, vol. 20, No. 2, Mar. 2003, pp. 63-73, XP011095793.
Calic J et al: "Efficient Key-Frame Extraction and Video Analysis" Proceedings—International Conference on Information Technology: Coding and Computing (ITCC'OZ), [Online] Apr. 8, 2002-Apr. 10, 2002 XP002462126.
International Search Report and Written Opinion—PCT/US2006/062130, International Search Authority—European Patent Office—Nov. 1, 2008.

\* cited by examiner

*Primary Examiner* — David Czekaj
*Assistant Examiner* — Anner Holder
(74) *Attorney, Agent, or Firm* — John Rickenbrode

(57) ABSTRACT

This disclosure describes identifying key frames from a sequence of video frames. A first set of information generated by operating on uncompressed data is accessed. A second set of information generated by compressing the data is also accessed. The first and second sets of information are used to identify key frames from the video frames.

29 Claims, 5 Drawing Sheets

SELECTING KEY FRAMES FROM VIDEO FRAMES

BACKGROUND

1. Field

Embodiments of the present invention pertain to the processing of video data.

2. Background

Universal media access (UMA) is expected to be important in the next generation of multimedia (e.g., video and audio) applications and devices. A fundamental concept of UMA is universal or seamless access to multimedia content, with the content being automatically selected and/or adapted for use on a user's device following the user's interaction with the device.

Mobile phones, for example, can be used to retrieve, view and transmit multimedia content. However, while the capabilities of mobile phones continue to increase, such devices are still somewhat limited relative to more powerful platforms such as personal computers. Data transmission and retrieval rates may also be a factor. The amount of video data is usually more of a consideration than the amount of audio data.

A video summarization technique can be used to generate a still-image storyboard that summarizes a sequence of video frames. The storyboard is composed of a relatively small number of representative frames—also referred to as key frames—extracted from an underlying video sequence that is composed of a much larger number of frames. Video summarization techniques can be important for UMA because they can be used to summarize video content for easier retrieval and transmission. That is, because key frames represent a much smaller amount of data in comparison to an entire video sequence, key frames can be more readily distributed and shared between limited-capability devices such as mobile phones.

There are a variety of different video summarization techniques in use. However, each of these conventional techniques is problematic in one or more ways. In general, one problem with conventional techniques is that they are complex and can consume a significant amount of computational resources in order to process the large volume of video data. Attempts to limit complexity often mean that information that may result in a better selection of key frames is not considered.

Accordingly, a method and/or system that can improve key frame selection, without overwhelming computational resources, would be advantages. Embodiments described herein provide these and other advantages.

SUMMARY

Methods and systems for identifying key frames from a sequence of video frames are described. In one embodiment, a first set of information—generated by operating on uncompressed data—is accessed. A second set of information—generated by compressing the data—is also accessed. The first and second sets of information are used to identify key frames from the video frames.

In general, the first and second sets of information provide measures of local similarity ("summary representation"), content variation coverage, and visual quality, which are combined to construct a novel cost function that is solved to identify which video frames can be used as key frames. For example, the subset of frames that minimizes the value of the cost function can be used as key frames. The process of identifying key frames can be performed either on-line (including real-time) or off-line.

In one embodiment, the first set of information referred to above is generated using operations implemented by a video-capture device, such as automatic white balancing, automatic exposure control, and automatic focus control. In one such embodiment, the type of information in the first set includes luminance information, chrominance information and focus values. In another embodiment, the type of information in the second set of information mentioned above includes motion vector information, macroblock prediction mode information, and distortion information. In addition to the first and second sets of information, information associated with a user's interactions with the video-capture device may also be considered.

By making use of the information generated from operations performed on the raw (uncompressed) video data and generated during compression of the video data, implementation is both practical and relatively low in complexity. These and other features, aspects and advantages will become better understood after having read the following detailed description that is illustrated in the various drawing figures.

DETAILED DESCRIPTION OF EMBODIMENTS

Figure 1:
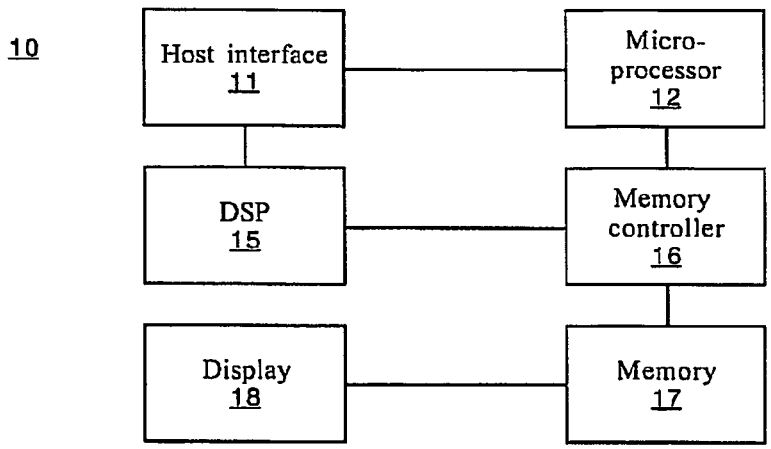
FIG. 1 is a block diagram of one embodiment of a device for processing video data.

In the following detailed description, numerous specific details are set forth in order to provide a thorough understanding of the embodiments of the present invention. However, it will be recognized by those skilled in the art that these embodiments may be practiced without these specific details or with equivalents thereof. In other instances, well-known methods, procedures and components have not been described in detail as not to unnecessarily obscure aspects of these embodiments.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access (volatile) memory (RAM), flash memory, read-only (non-volatile) memory (ROM), erasable programmable ROM (EPROM), electrically erasable programmable ROM (EEPROM), registers, hard disk, a removable disk, a compact disk ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The descriptions and examples provided herein are discussed in the context of video-based data (also referred to as video data, media data or multimedia data or content); however, other types of data, such as but not limited to image-based data, Web page-based data, graphic-based data, may be used.

FIG. 1 is a block diagram of one embodiment of a device 10 for processing video data. The device 10 includes the components of an execution platform for implementing various embodiments of a video summarization system. As depicted in FIG. 1, the device 10 includes a microprocessor 12 (e.g., an Advanced Reduced Instruction Set Computer Machine, or ARM, processor) coupled to a digital signal processor DSP 15 via a host interface 11. The host interface 11 translates data and commands passing between the microprocessor 12 and the DSP 15 into their respective formats. In the present embodiment, both the microprocessor 12 and the DSP 15 are coupled to a memory 17 via a memory controller 16. In the example of FIG. 1, the memory 17 is a shared memory, whereby the memory 17 stores instructions and data for both the microprocessor 12 and the DSP 15. In such an embodiment, access to the shared memory 17 is through the memory controller 16. In one embodiment, the shared memory 17 also includes a video frame buffer for storing pixel data that drives a coupled display 18.

As mentioned above, certain processes and steps of a video summarization system are realized, in one embodiment, as a series of instructions (e.g., a software program or programs) that reside within computer-readable memory (e.g., memory 17) of a computer system (e.g., device 10) and executed by the microprocessor 12 and DSP 15 of the device 10. When executed, the instructions cause the device 10 to implement the functionality of the embodiments described below. In another embodiment, certain processes and steps are realized in hardware.

Figure 2:
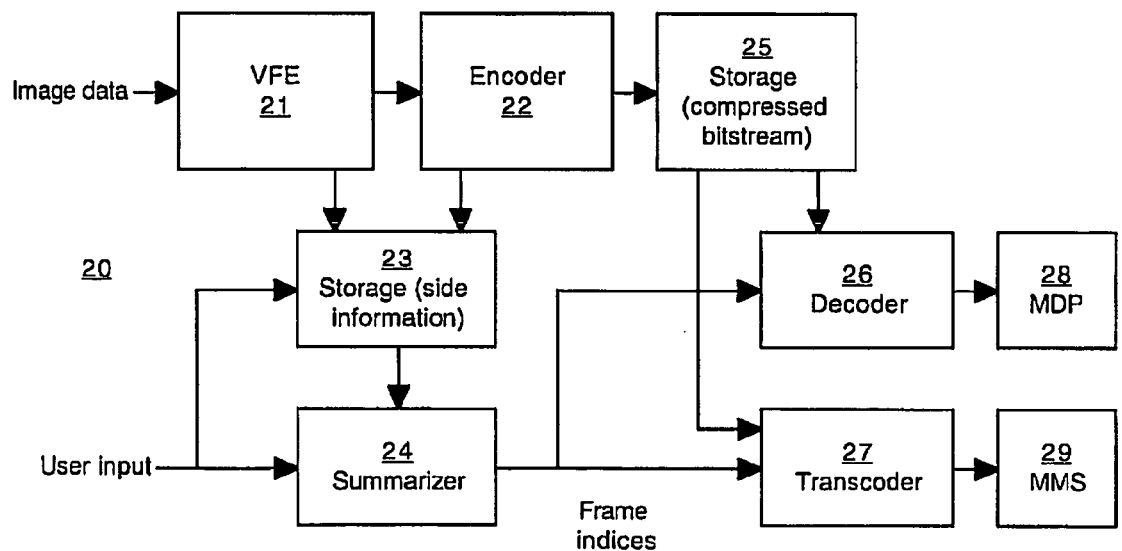
FIG. 2 is a functional block diagram of one embodiment of a video summarization system.

FIG. 2 is a functional block diagram of one embodiment of a video summarization system 20 that may be implemented using the device 10 of FIG. 1. A video sequence of raw (uncompressed) image data is captured by a video-capture device (e.g., a digital video camera, a digital camera, or the like) incorporating the elements of the device 10. The raw image data includes a sequence of frames of data, each frame in essence representing a still image, the sequence of frames representing a contiguous set of images that when played back (displayed) result in a moving picture. The raw image data may be stored before it is further processed by the system 20. If the data is stored, processing can subsequently occur off-line. Processing can also occur on-line or in real time.

With reference to FIG. 2, in the present embodiment, the sequence of raw image data enters the video front end (VFE) 21, which analyzes the data, computes certain types of information (also referred to herein as a first set of information or first information), and stores the first set of information in the storage element 23. The functions of the VFE 21, and the type of information that can be included in the first set of information, are described more fully below in conjunction with FIG. 3.

The VFE 21 of FIG. 2 forwards the processed, but still uncompressed, video data to the encoder 22, which compresses (encodes) the video data. The video data may be compressed using Moving Pictures Experts Group (MPEG) compression (encoding) schemes, such as but not limited to MPEG-1, MPEG-2 and MPEG4, and International Telecommunication Union (ITU) encoding schemes such as H.261, H.263 and H.264. In general, encoding schemes that make use of temporal redundancy or motion compensation—more specifically, encoding schemes that use motion vectors to increase the amount of compression (the compression ratio)—can be used.

The compressed bitstream encoded by the encoder 22 is stored in a storage element 25. Although illustrated as separate units, the storage elements 23 and 25 may be parts of the same memory unit. In one embodiment, the compressed bitstream represents a compressed sequence of video frames, known in the art as I-frames, P-frames and B-frames, each of which is identified by a respective frame index.

Certain types of information (also referred to herein as a second set of information or second information) are generated by the encoder 22 as part of the compression process. In one embodiment, the second set of information is stored in the storage element 23, along with the first set of information computed by the VFE 21. In one embodiment, the second set of information includes information such as, but not limited to, distortion measure information, the macroblock prediction mode, and the aforementioned motion vector information. Various distortion measures can be used; one distortion measure known in the art is the "sum of the absolute difference" (SAD). The macroblock prediction mode may be "inter" or "intra"—an inter-macroblock is dependent on the content of another macroblock and is derived from another macroblock using motion information; an intra-macroblock is independent of the content of another macroblock and does not contain any motion information. The first and second sets of information may be collectively referred to as side information or hinting information.

In overview, in one embodiment, the summarizer 24 uses the side information from the storage element 23 to construct a cost function, which is evaluated in order to select key frames from the sequence of video frames that are stored in the storage element 25. For example, the subset of frames that minimizes the value of the cost function can be identified as key frames. The construction and evaluation of the cost function is described in more detail in conjunction with FIG. 4 below.

Continuing with reference to FIG. 2, in one embodiment, the summarizer 24 identifies the indices of the frames that are selected to be key frames; the indices can be later used to retrieve the key frames from the storage element 25. However, in another embodiment, the video frames selected to be key frames can be duplicated and stored; that is, both the key frames and the entire video sequence from the which the key frames were selected are redundantly stored.

In one embodiment, the summarizer 24 also considers user inputs in the process of selecting key frames. The user inputs may be directly input by the user, or they may be inferred from the user's actions. Direct user inputs can include user-specified values for certain parameters used by the system 20, such as the compression ratio (e.g., the ratio of the number of key frames to the number of frames in the video sequence) used by the summarizer 24; other types of direct user inputs are mentioned in the discussion of FIG. 4, below. Inferred user inputs are inputs derived from the user's interactions with the video-capture device. For example, the act of a user "zooming in" on a subject for a period of time may be an indication that the subject is of particular interest to the user. The sequence of frames captured during that period of time, or perhaps just the beginning frame of the sequence, can be identified (e.g., tagged) in some way, and this information can then be factored into the key frame selection process described herein.

The system 20—specifically, the summarizer 24—may operate in an off-line mode, or in an on-line or real-time mode. In one embodiment, the operating mode of the system 20 is selected by the user.

In an off-line mode, the summarizer 24 may consider the side information for the entire sequence of video frames. In an on-line or real-time mode, the summarizer 24 may consider the side information for only a part of a sequence of video frames at a time. That is, for example, in an on-line or real-time mode, the summarizer 24 first considers only a portion of a sequence of video frames, selects a key frame or key frames for that portion, and then flushes that portion. Next, the summarizer 24 considers the next portion of the sequence, selecting a key frame or key frames for the second portion before flushing it, and so on. Off-line processing can identify key frames that are more representative of the entire sequence of video frames. On-line or real-time processing can utilize less storage than off-line processing.

When the key frames are identified, in one embodiment the frame indices identifying the key frames are forwarded to a decoder 26, which retrieves the appropriate frames from the memory 25 and decompresses them. The decompressed key frames can then be sent to a multimedia display processor (MDP) 28 for displaying and/or editing. In another embodiment, the frame indices identifying the key frames are forwarded to a transcoder 27, which retrieves the appropriate frames from the memory 25 and transcodes them. Example transcoding operations include bitrate reduction, rate shaping, spatial downsampling, and frame rate reduction. In general, the transcoder 27 takes the compressed video bitstream as input, and processes it to produce another compressed video bitstream as output. The transcoded bitstream can then be sent to a multimedia messaging service (MMS) 29, to be transmitted to another device (e.g., another mobile device), which in turn decodes the bitstream for displaying and/or editing.

Figure 3:
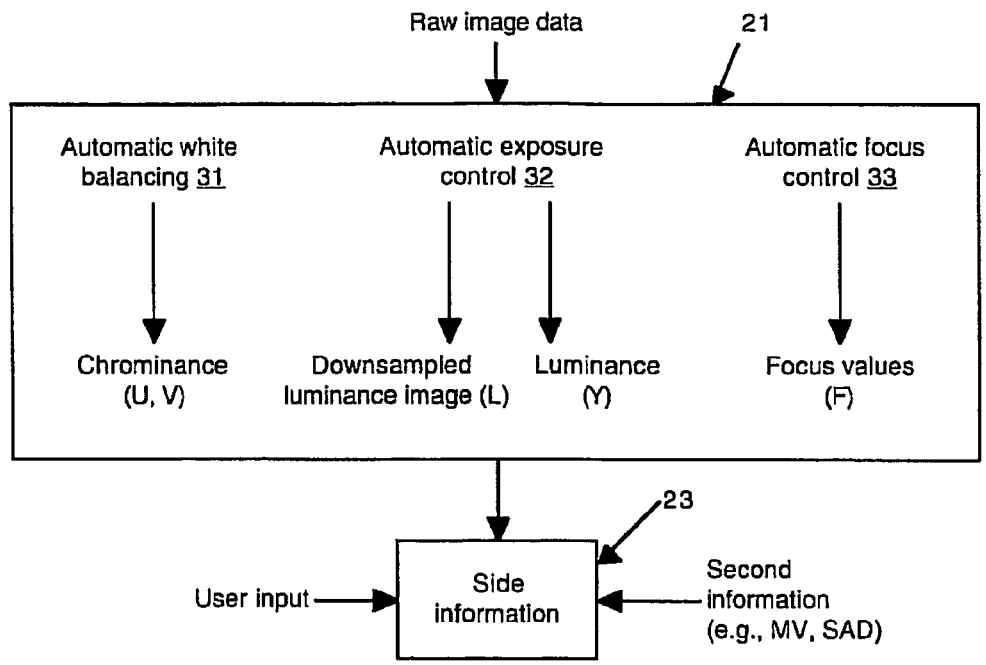
FIG. 3 is a block diagram showing the flow of data in one embodiment of a video front end in a video summarization system.

FIG. 3 is a block diagram showing the flow of data in one embodiment of a VFE 21 in a video summarization system (e.g., the system 20 of FIG. 2). As mentioned above, the VFE 21 generates a first set of information during processing of the raw, or uncompressed, image data. In the present embodiment, the first set of information is generated by the automatic white balancing operations 31, automatic exposure control operations 32, and automatic focus control operations 33 performed by the VFE 21.

In one embodiment, the automatic white balancing operations 31 are used to determine the gains on the red, green and blue channels that are needed to compensate for a color shift in the white color value due to the color of the scene illumination. In one such embodiment, the automatic white balancing operations 31 include pixel color metering, illumination estimation, and white balancing. From the automatic white balancing operations 31, chrominance values (e.g., Cb and Cr, also referred to as 'U' and 'V') are determined for each video frame. In one embodiment, the chrominance values for each frame are represented as a 128-point histogram (64 points for 'U' and 64 points for 'V').

In one embodiment, the automatic exposure control operations 32 include light metering, scene analysis, and exposure compensation. In one such embodiment, the input image is divided into 256 regions, and each of these regions is further subdivided into four sub-regions. For each of the 256 regions, the sum of the luminance values of the pixels in the region, the minimum local sum luminance value in the region, the maximum local sum luminance value in the region, and the maximum absolute delta local sum luminance value in the region, are generated. Using this information, the sum of the luminance values of the pixels in each sub-region is determined. Ultimately, a 64-point histogram of luminance values (Y) is determined for each frame. Also, a downsampled 8×8 luminance image (L) is also generated for each frame.

In one embodiment; the automatic focus control operations 33 include two sub-processes: 1) a process to determine a focus value (F) for a given lens position; and 2) a process to determine a focus position based on a series of focus values. In one embodiment, the focus value 'F' is determined from the luminance values 'Y' using equation (1):

$$F = \sum_i \text{MAX}_j \{[Y(i, j) - Y(i, j+2)]^2 + \qquad (1)$$

$$[Y(i, j) - Y(i+2, j)]^2 + [Y(i, j) - Y(i+2, j+2)]^2\},$$

where: j=J*2, J*2+2, J*2+4, . . . , 2*X−2 and i=I*2, I*2+2, I*2+4, 2*Z−2, where 'I' is the starting row of a focus window in the subsampled-by-two domain; 'J' is the starting column of the focus window in the subsampled-by-two domain; 'Z' is the ending row of the focus window in the subsampled-by-two domain (Z−J≦508); 'X' is the ending column of the focus window in the subsampled-by-two domain (X−J≦508); and X−J is even. A higher value of 'F' is expected to correspond to a lower probability of blurriness in the image.

Figure 4:
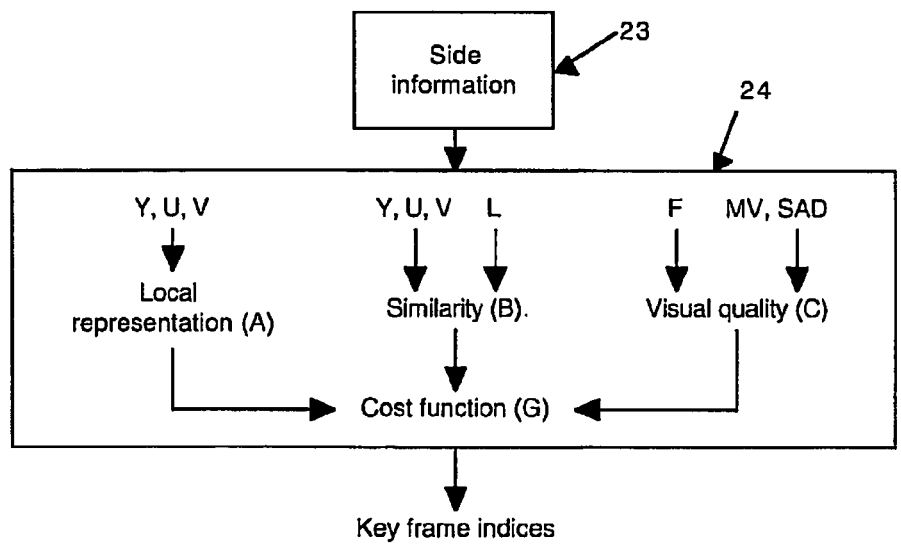
FIG. 4 is a block diagram showing the flow of data in one embodiment of a video summarizer in a video summarization system.

FIG. 4 is a block diagram showing the flow of data in one embodiment of a video summarizer 24 in a video summarization system (e.g., the system 20 of FIG. 2). In the discussion below, 'N' denotes the total number of frames in the sequence of video frames under consideration, and 'M' is the length of the video summary (that is, 'M' is the number of key frames). In general, the video summarizer 24 identifies the indices of 'M' selected frames $a_i$ (i=1, 2, . . . , M, and $a_0$=0), considering local representation or similarity, content variation, and visual quality.

As used herein, a frame that provides satisfactory local representation or similarity is a frame that is similar enough to its neighboring frames to represent them in the video summary. That is, for a given sequence of video frames, it is desirable for the key frame representing that sequence to be similar enough to the other frames in that sequence such that a user, seeing only the key frame, has some idea of what subject matter is captured by the sequence. In the example of FIG. 4, color similarity is used to evaluate the similarity of a group of neighboring frames. In one embodiment, with reference also to FIG. 3, the 'Y' and 'UV' color histograms obtained from the automatic exposure and white balancing processes 31 and 32 are represented as a single 192-point histogram 'H,' which is used to define the local representation (A) of each frame 'i' (i=1, 2, ..., M) using equations (2) and (3):

$$A(i) = Sim(H_{i-1}, H_i), \ i = N; \text{ or} \qquad (2)$$

$$A(i) = \frac{Sim(H_{i-1}, H_i) + Sim(H_i, H_{i+1})}{2}, \text{ otherwise;} \qquad (3)$$

where "Sim" is a function used to compare two one-dimensional vectors, defined by equation (4) as follows:

$$Sim(\bar{x}, \bar{y}) = \frac{\bar{x} \cdot \bar{y}}{\|\bar{x}\| \cdot \|\bar{y}\|}. \qquad (4)$$

Content variation is addressed by considering the similarity (more specifically, the dissimilarity) between two consecutive frames. In the example of FIG. 4, with reference also to FIG. 3, the YUV (YCbCr) information obtained from the automatic exposure control and white balancing processes 31 and 32, and the downsampled 8×8 luminance image 'L' from the automatic exposure control process 32, are used to define the similarity (B) of two frames using equations (5) and (6):

$$B(i,j)=0, i=0; \text{ or} \qquad (5)$$

$$B(i,j)=\gamma Sim(H_i,H_j)+(1-\gamma)Sim(L_i,L_j), \text{otherwise;} \qquad (6)$$

where 'γ' is a weighting factor with an adjustable value between zero and one. The weighting factor 'γ' can be a preset value or a user-specified input. In equations (5) and (6), the similarity in luminance is considered in order to detect situations in which an object moves on a still or relatively stable background.

As used herein, a frame that provides satisfactory visual quality is a frame that has less blurriness (e.g., due to shifting of the video-capture device) and that includes objects and/or backgrounds that have less movement relative to neighboring frames. In the example of FIG. 4, with reference also to FIGS. 2 and 3, the visual quality (C) of a frame is defined using both the focus value 'F' determined for that frame from the automatic focus control process 33, and the second set of information determined by encoder 22, as follows:

$$C(i) = \eta \|MV_i\| S_i^2 + (1-\eta)(F_{MAX} - F_i), \ i = N; \text{ or} \qquad (7)$$

$$C(i) = \eta \frac{\|MV_i\| S_i^2 + \|MV_{i+1}\| S_{i+1}^2}{2} + (1-\eta)(F_{MAX} - F_i), \qquad (8)$$

otherwise;

where $\|MV\|$ denotes the total length of the macroblock motion vectors for the frame, 'S' is the total macroblock SAD in the frame, $F_{MAX}$ is a pre-assigned upper bound of the focus value, and 'η' is an adjustable weighting factor with a value between zero and one. The weighting factor 'η' can be a preset value or a user-specified input.

In one embodiment, key frames are selected by identifying those frames for which $$\sum_{i=1}^{M} A(a_i) \text{ and } \sum_{i=1}^{M} C(a_i) \text{ are larger and } \sum_{i=1}^{M} B(a_{i-1}, a_i)$$

is smaller, by combining these terms as follows:

$$\text{Minimize } T(a_1, a_2, \ldots, a_M) = \qquad (9)$$

$$\sum_{i=1}^{M} \{\alpha[1 - A(a_i)] + \beta B(a_{i-1}, a_i) + [1 - \alpha - \beta]C(a_i)\},$$

where 'α' and 'β' are adjustable weighting factors with values between zero and one. The weighting factors 'α' and 'β' can be preset values or user-specified inputs.

Equation (9) can be solved in an exhaustive manner by considering every possible combination of 'M' key frames (selected from the sequence of 'N' frames), to determine which combination minimizes 'T.' That is, in one embodiment, the combination of 'M' frames that minimizes 'T' is the set of frames selected as key frames.

Rather than solving equation (9) exhaustively, a cost function 'G' based on equation (9) can be defined using equation (10):

$$G_k(a_k) = \underset{a_1, a_2, \ldots, a_{k-1}}{\text{Minimize}} T(a_1, a_2, \ldots, a_k), \qquad (10)$$

which represents the minimum sum up to and including frame $a_k$. From equation (10):

$$G_M(a_M) = \underset{a_1, a_2, \ldots, a_{M-1}}{\text{Minimize}} T(a_1, a_2, \ldots, a_M), \text{ and} \qquad (11)$$

$$\underset{a_M}{\text{Minimize }} G_M(a_M) = \underset{a_1, a_2, \ldots, a_M}{\text{Minimize}} T(a_1, a_2, \ldots, a_M). \qquad (12)$$

Given the cost function $G_{k-1}(a_{k-1})$, the selection of the next frame $a_k$ is independent of the selection of the previous frames $a_1, a_2, \ldots, a_{k-2}$. This observation is demonstrably true because the cost function can be expressed recursively as:

$$G_{k+1}(a_{k+1}) = \underset{a_k}{\text{Minimize}} \qquad (13)$$

$$\{G_k(a_k) + \alpha[1 - A(a_{k+1})] + \beta B(a_k, a_{k+1}) + (1 - \alpha - \beta)C(a_{k+1})\}.$$

The recursive representation of the cost function makes a future step of the solution process independent from its past steps, which is a foundation of dynamic programming. Equation (13) can be solved by converting the problem into a graph theory problem of finding the shortest path in a directed acyclic graph (DAG).

Figure 5:
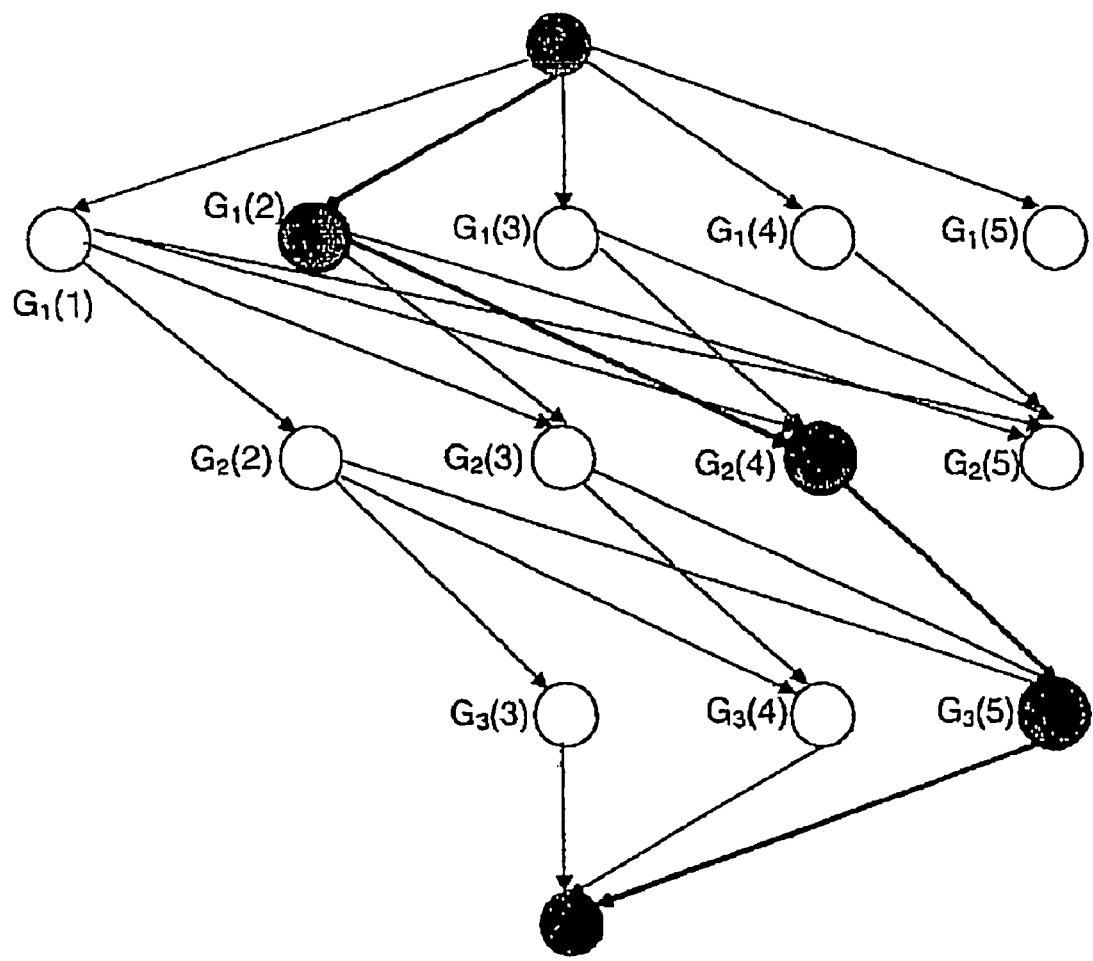
FIG. 5 is an example of a directed acyclic graph that may be used in a video summarization system.

FIG. 5 is an example of a DAG 50 that may be used by a video summarization system such as the system 20 of FIG. 2. In the example of FIG. 5, 'M' is three and 'N' is five. The computational complexity of solving a graph theory problem using a DAG is $O(NM^2)$.

Figure 6:
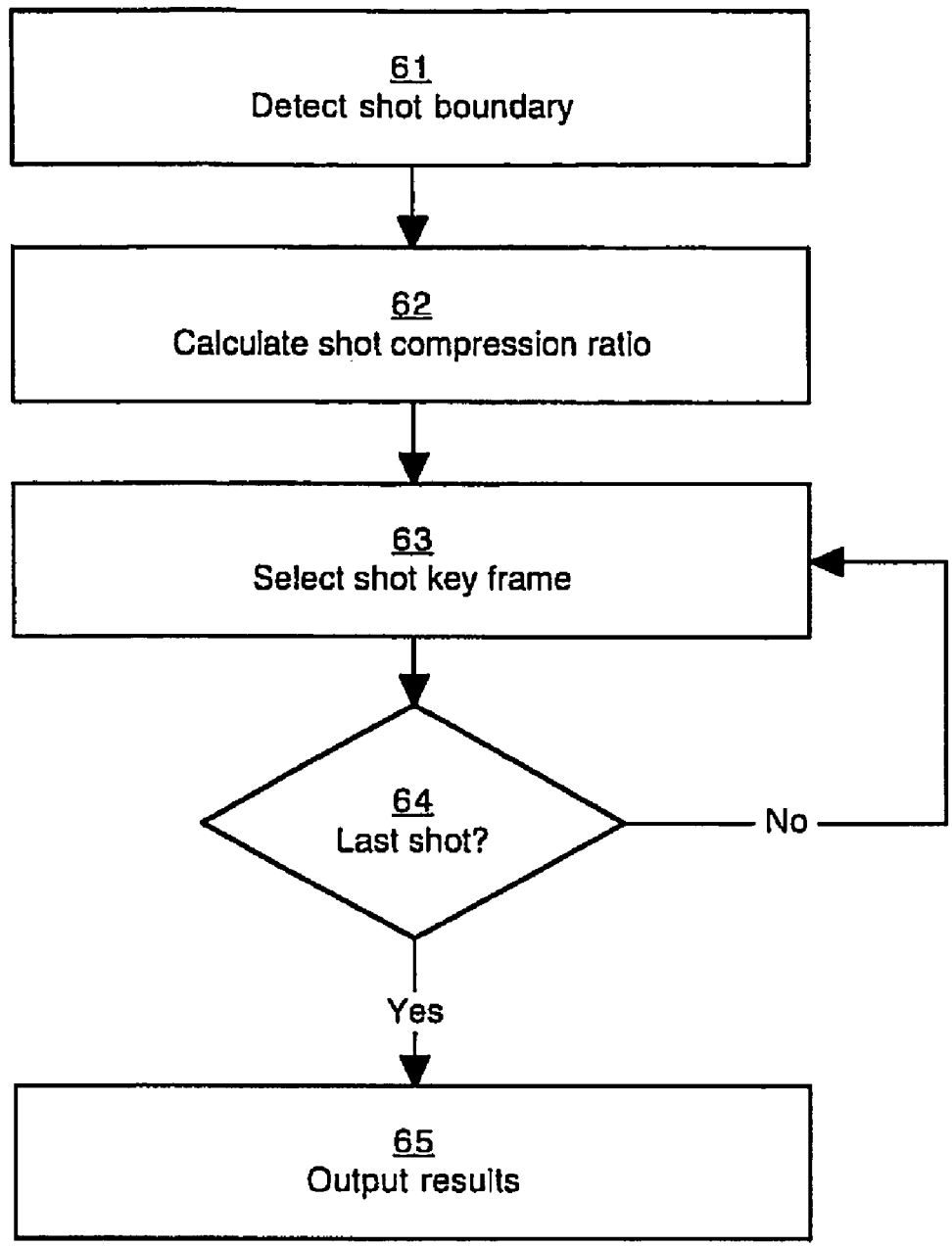
FIG. 6 is a flowchart of one embodiment of a video summarization method.

FIG. 6 is a flowchart 60 of one embodiment of a video summarization method. In one embodiment, the method described by the flowchart 60 is performed by the video summarizer 24 of FIGS. 2 and 4. Aspects of the method described by the flowchart 60 can be used, for example, in situations in which the number 'N' of video frames in a sequence exceeds memory capacity, or where the computational complexity is greater than the allocated or allowed power and processing time. In general, an objective of the method of flowchart 60 is to divide the video sequence into a number of "shots," and then find the key frame or frames within each shot. In essence, if 'M' key frames are to be selected from a sequence of 'N' video frames, the method of flowchart 60 is used to identify how many frames are to be included in each shot, and how many key frames are to be allocated to each of the various shots. The number of frames per shot does not necessarily have to be the same. Furthermore, the number of key frames per shot does not have to be the same.

In the block 61 of FIG. 6, a shot boundary is identified. That is, for example, the frames that are to be included in a first shot are identified. In one embodiment, the color histogram 'H' is used in equations (2) and (3) to determine the local similarity 'A' between two consecutive frames. In such an embodiment, a threshold is defined and applied. A shot boundary between two consecutive frames can then be identified when the similarity 'A' between the two frames fails to satisfy the threshold, thus indicating a possible scene change.

If the number of shot boundaries exceeds the defined length of the summary—that is, if the number of shot boundaries is greater than 'M'—then the shot boundaries with the minimum local similarities 'A' are selected and the frames corresponding to the shot boundaries are selected as key frames. Otherwise, the number of key frames per shot is determined, and the flowchart 60 proceeds to the block 62.

In the block 62, a shot compression ratio based on motion activity is calculated using equation (14):

$$M_i = 1 + \frac{\sum_{j=1+\sum_{k=1}^{i-1} n_k}^{\sum_{k=1}^{i} n_k} (\|MV_j\| S_j^2)}{\sum_{j=1}^{n} (\|MV_j\| S_j^2)} (M - P), \quad (14)$$

where 'P' is the total number of shots, '$n_i$' is the length of each shot (the number of frames in a shot 'i'), $M_i$ is the number of key frames in shot 'i,' and 'S' is the total macroblock SAD in the frame. The use of equation (14) will result in more key frames being assigned to shots in which the video sequence contains more motion and activity, and fewer key frames being assigned to shots with less motion and activity.

In the block 63, one or more key frames are selected for the shot. In one embodiment, the key frames are selected using the technique described above in conjunction with FIG. 4.

In the block 64 of FIG. 6, a determination is made as to whether or not there are additional shots yet to be considered. If so, the flowchart 60 returns to the block 63; otherwise, flowchart 60 proceeds to the block 65.

In the block 65, with reference also to FIG. 2, the results identifying the key frame(s) per shot are output from the summarizer 24 to the decoder 26 or the transcoder 27, as previously described herein.

Figure 7:
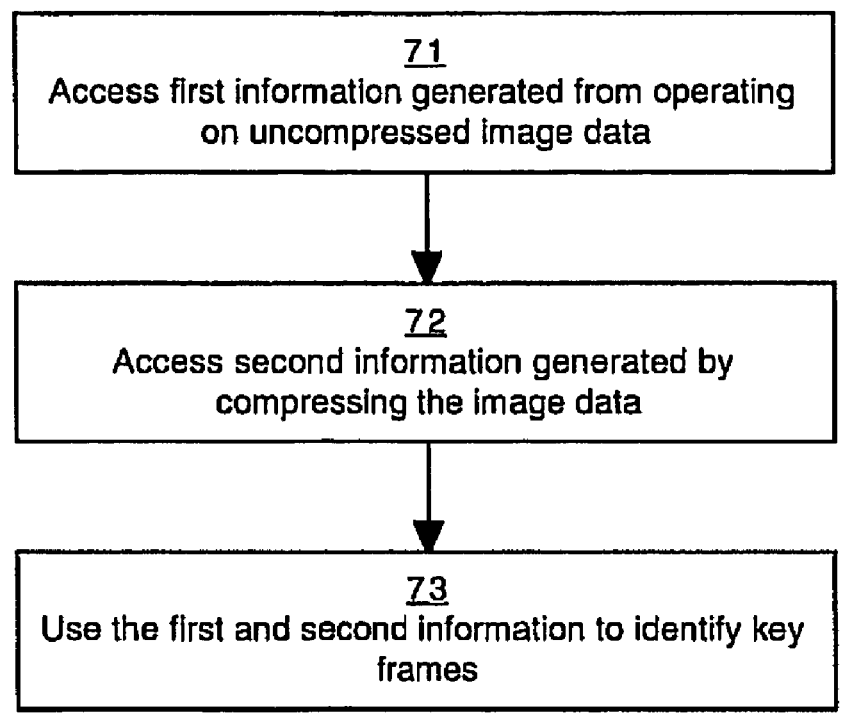
FIG. 7 is a flowchart of another embodiment of a video summarization method.

FIG. 7 is a flowchart 70 of an embodiment of a method of identifying key frames. In the block 71, a first set of information, generated from operating on uncompressed image data, is accessed. In one embodiment, with reference also to FIGS. 2 and 3, the operations are performed by the VFE 21, and the first set of information is accessed from the storage element 23. In one embodiment, the operations include automatic white balancing 31, automatic exposure control 32, and automatic focus control 33. In one embodiment, the first set of information includes luminance information (Y), chrominance information (U, V), and focus values (F).

In the block 72 of FIG. 7, a second set of information, generated by compressing the image data, is accessed. In one embodiment, with reference also to FIG. 2, the image data is compressed by the encoder 22, and the second set of information is accessed from the storage element 23. In one embodiment, the second set of information includes motion vector information, macroblock prediction mode information, and distortion information.

In the block 73 of FIG. 7, the first set of information and the second set of information are combined to identify one or more key frames. In one embodiment, with reference also to FIG. 4, the key frames are selected by the summarizer 24. In one such embodiment, the summarizer 24 constructs a cost function by combining, for each video frame, a first value, a second value and a third value, where the first value corresponds to a measure of similarity (A) between the video frame and others of the video frames, the second value corresponds to a measure of similarity (B) between the video frame and a contiguous video frame, and the third value (C) corresponds to a measure of visual quality of the video frame. In such an embodiment, the summarizer 24 evaluates a cost function to determine a score for a subset of the video frames. Different subsets can be evaluated, and in one embodiment, the subset of video frames for which the cost function is minimized is used as the key frames.

In one embodiment, as described in conjunction with FIG. 6, the video frames are separated into a plurality of segments, or shots, of contiguous video frames. In one such embodiment, a number of key frames is allocated to each of the shots. In one embodiment, the key frames are allocated using motion vector information and distortion information.

Although specific steps are disclosed in the flowcharts 60 and 70 of FIGS. 6 and 7, such steps are exemplary. That is, various other steps or variations of the steps recited in the flowcharts 60 and 70 may be performed. It is appreciated that the steps in the flowcharts 60 and 70 may be performed in an order different than presented, and that the steps in the flowcharts 60 and 70 are not necessarily performed in the sequence illustrated.

In summary, a novel video summarization technique that uses hinting information generated by, for example, a video front end and an encoder to select key frames, is described. Summary representation, content variation coverage, and key frame visual quality (e.g., focus) are considered in a general framework. Specific feature spaces, covering color, motion and visual quality, for example, and perhaps also including user inputs, are combined in a novel cost function that guides the selection of key frames. In one embodiment, the cost function is mapped into a graph theory problem and solved using dynamic programming.

By taking advantage of the outputs of the video front end and the encoder, for example, the technique is relatively low in complexity because it does not need to access or process the large volume of data of the original video sequence. As such, the technique is suitable for real-time or on-line processing as well as off-line processing. Furthermore, memory resources are effectively utilized and managed.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of identifying key frames among video frames, the method comprising:
    accessing first information, wherein the first information comprises at least two of luminance information derived from automatic white balancing, chrominance information derived from automatic exposure control, and focus values derived from automatic focus control;
    accessing second information, wherein the second information comprises at least one of motion vector information, macroblock prediction mode information, and distortion information;
    generating a cost function based on the first information and the second information; and
    evaluating the cost function to identify a key frame; and
    selecting the key frame among the video frames based on the cost function.

2. The method of claim 1, wherein at least one of automatic white balancing, automatic exposure control, and automatic focus control is performed by a video-capable camera.

3. The method of claim 1, wherein the first information includes the luminance information, the chrominance information and the focus values.

4. The method of claim 1, wherein the second information includes the motion vector information, the macroblock prediction mode information, and the distortion information.

5. The method of claim 1, further comprising using the luminance information and the chrominance information to determine a value that corresponds to a measure of similarity between one of the video frames and other selected video frames.

6. The method of claim 1, further comprising using the luminance information to determine a value that corresponds to a measure of similarity between two consecutive video frames.

7. The method of claim 1, further comprising using the focus values and the motion vectors to determine a value that corresponds to a measure of visual quality of a video frame.

8. The method of claim 1, further comprising:
    combining a first value, a second value and a third value for a video frame, wherein the first value corresponds to a measure of similarity between the video frame and others of the video frames, the second value corresponds to a measure of similarity between the video frame and a contiguous video frame, and the third value corresponds to a measure of visual quality of the video frame, wherein the combining is performed for each video frame in a subset of the video frames to determine a score for the subset and wherein the combining is performed for different subsets of the video frames to determine scores for the subsets; and
    selecting, using the scores, one of the subsets, wherein video frames therein are used as the key frames.

9. The method of claim 1, further comprising:
    separating the video frames into a plurality of segments of contiguous video frames; and
    allocating a number of key frames to each of the segments, wherein the total number of key frames does not exceed a prescribed maximum.

10. The method of claim 9, wherein allocating is performed using information selected from at least one of motion vector information and distortion information.

11. A non-transitory computer-usable storage medium having computer-readable program instructions embodied therein for causing a processor to perform key frame selection wherein the instructions cause the processor to:
    access first information, wherein the first information comprises at least two of luminance information derived from automatic white balancing, chrominance information derived from automatic exposure control, and focus values derived from automatic focus control;
    access second information, wherein the second information comprises at least one of motion vector information, macroblock prediction mode information, and distortion information;
    generate a cost function based on the first information and the second information; and
    evaluate the cost function to identify a key frame; and
    select the key frame from a plurality of video frames based on the cost function.

12. The non-transitory computer-usable storage medium of claim 11, further comprising instructions that cause the processor to perform key frame selection that includes using the luminance information and the chrominance information to determine a value that corresponds to a measure of similarity between one of the video frames and other selected video frames.

13. The non-transitory computer-usable storage medium of claim 11, further comprising instructions that cause the processor to perform key frame selection using the luminance information to determine a value that corresponds to a measure of similarity between two consecutive video frames.

14. The non-transitory computer-usable storage medium of claim 11, further comprising instructions that cause the processor to perform key frame selection that includes determining, using the focus values and the motion vectors, a value that corresponds to a measure of visual quality of a video frame.

15. The non-transitory computer-usable storage medium of claim 11, further comprising instructions that cause the processor to perform key frame selection that includes:
    combining a first value, a second value and a third value for a video frame, wherein the first value corresponds to a measure of similarity between the video frame and others of the video frames, the second value corresponds to a measure of similarity between the video frame and a contiguous video frame, and the third value corresponds to a measure of visual quality of the video frame, wherein the combining is performed for each video frame in a subset of the plurality of video frames to determine a score for the subset and wherein the combining is performed for different subsets of the plurality of video frames to determine scores for the subsets; and
    selecting, using the scores, one of the subsets, wherein video frames therein are used as the key frames.

16. The non-transitory computer-usable storage medium of claim 11, further comprising instructions that cause the processor to perform key frame selection that includes:

separating the video frames into a plurality of segments of contiguous video frames; and allocating a number of key frames to each of the segments, wherein the total number of the key frames does not exceed a prescribed maximum.

17. A device for identifying key frames in a plurality of video frames, comprising:

means for accessing first information, wherein the first information comprises at least two of luminance information derived from automatic white balancing, chrominance information derived from automatic exposure control, and focus values derived from automatic focus control;

means for accessing second information, wherein the second information comprises at least one of motion vector information, macroblock prediction mode information, and distortion information;

means for generating a cost function based on the first information and the second information; and means for evaluating the cost function to identify a key frame; and means for selecting the key frame from the plurality of video frames based on the cost function.

18. The device of claim 17, wherein at least one of automatic white balancing, automatic exposure control and automatic focus control is performed by a video-capable camera.

19. The device of claim 17, wherein the first information includes the luminance information; the chrominance information; and the focus values.

20. The device of claim 17, wherein the second information includes the motion vector information, the macroblock prediction mode information, and the distortion information.

21. A device comprising:

a video front end for operating on uncompressed image data comprising a plurality of video frames to generate first information;

an encoder coupled to the video front end for compressing of the image data and generating second information;

a memory coupled to the video front end and the encoder for storing the first and second information; and a microprocessor coupled to the memory for executing instructions that implement a method for identifying key frames in the plurality of video frames, the instructions being executed to:

access the first information, wherein the first information comprises at least two of luminance information derived from automatic white balancing, chrominance information derived from automatic exposure control, and focus values derived from automatic focus control;

access the second information, wherein the second information comprises at least one of motion vector information, macroblock prediction mode information, and distortion information;

generate a cost function based on the first information and the second information; and evaluate the cost function to identify a key frame; and select the key frame from the plurality of video frames based on the cost function.

22. The device of claim 21, wherein the first information includes the luminance information, the chrominance information and the focus values.

23. The device of claim 21, wherein the second information includes the motion vector information, the macroblock prediction mode information and the distortion information.

24. The device of claim 21, the microprocessor further executing instructions for determining, using the luminance information and the chrominance information, a value that corresponds to a measure of similarity between one of the video frames and other selected video frames.

25. The device of claim 21, the microprocessor further executing instructions for determining, using the luminance information, a value that corresponds to a measure of similarity between two consecutive video frames.

26. The device of claim 21, the microprocessor further executing instructions for determining, using the focus values and the motion vectors, a value that corresponds to a measure of visual quality of a video frame.

27. The device of claim 21, the microprocessor further executing instructions for:

combining a first value, a second value and a third value for a video frame, wherein the first value corresponds to a measure of similarity between the video frame and others of the video frames, the second value corresponds to a measure of similarity between the video frame and a contiguous video frame, and the third value corresponds to a measure of visual quality of the video frame, wherein the combining is performed for each video frame in a subset of said plurality of video frames to determine a score for said subset and wherein said combining is performed for different subsets of said plurality of video frames to determine scores for said subsets; and selecting, using the scores, one of the subsets, wherein video frames in the one of the subsets are used as key frames.

28. The device of claim 21, the microprocessor further executing instructions for:

separating the video frames into a plurality of segments of contiguous video frames; and allocating a number of key frames to each of the segments, wherein the total number of the key frames does not exceed a prescribed maximum.

29. The device of claim 28, wherein the allocating is performed using at least one of the motion vector information and the distortion information.

* * * * *